H. W. RIGHTMYER.
POPPER OR ROASTER.
APPLICATION FILED JAN. 20, 1906.

906,934.

Patented Dec. 15, 1908.

WITNESSES:
Frank B. Hoffman
J. F. Byrne

INVENTOR
H. W. Rightmyer
BY Victor J. Evans
Attorney

UNITED STATES PATENT OFFICE.

HOMER W. RIGHTMYER, OF ROWLESBURG, WEST VIRGINIA.

POPPER OR ROASTER.

No. 906,934. Specification of Letters Patent. Patented Dec. 15, 1908.

Application filed January 20, 1906. Serial No. 297,024.

*To all whom it may concern:*

Be it known that I, HOMER W. RIGHT-MYER, a citizen of the United States, residing at Rowlesburg, in the county of Preston and State of West Virginia, have invented new and useful Improvements in Poppers or Roasters, of which the following is a specification.

This invention has relation to improvements in poppers and roasters, and it consists in the construction and arrangement of parts, as will be hereinafter described and particularly pointed out in the claims.

Figure 1:
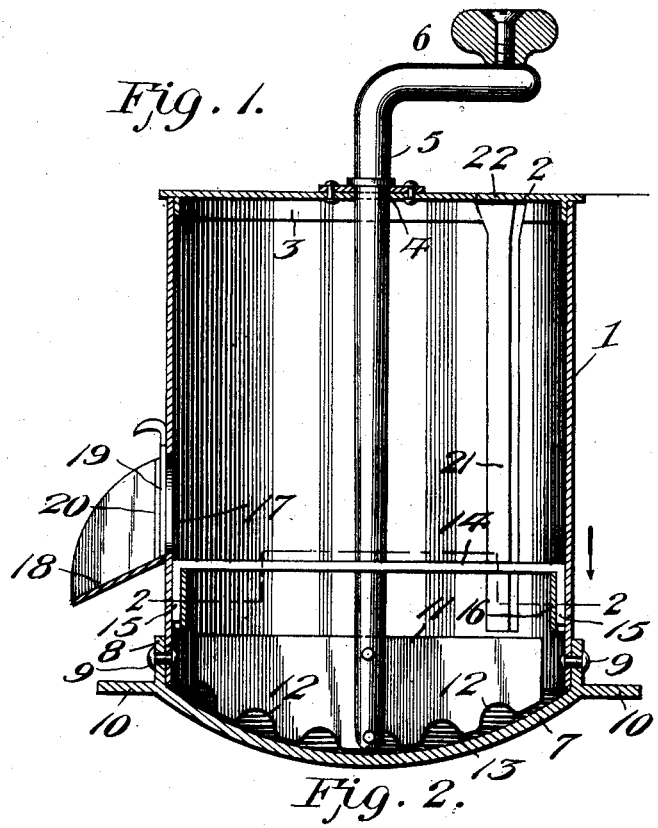
Figure 2:
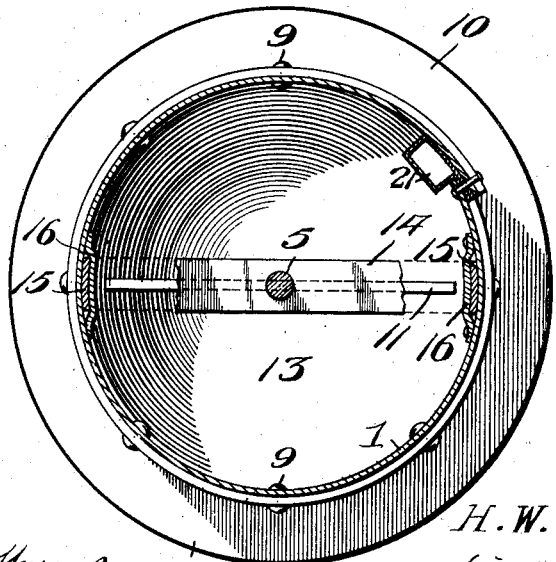

In the accompanying drawings, Figure 1 is a vertical sectional view of a popper or roaster embodying the present invention; and Fig. 2 is a horizontal cross-section through the same on the line 2—2 of Fig. 1.

Under the preferred embodiment of this invention, the body or receptacle of the popper or roaster is in the form of a hollow cylinder 1 provided at the top with a removable cover 2 having a retaining flange 3 which enters the top of the receptacle and positions the cover in place, said cover being also provided with a central bearing opening 4, in which is received and journaled a rotary shaft 5 provided at its upper and outer end with an operating crank handle 6.

The bottom of the receptacle is dished or made in concavo-convex form, as shown at 7, and provided at its periphery with an upwardly extending annular flange 8 within which the bottom of the receptacle 1 is secured by suitable fasteners 9. The bottom is further provided along its marginal edge with an outwardly extending circumferential flange 10, which forms a support or rest for the receptacle when placed upon a stove, the dished bottom 7 being received in one of the stove holes, while the flange 10 rests upon the stove top.

Secured to the bottom of the shaft 5 is a diametrically disposed stirrer or agitator 11 consisting of a straight plate, the lower edge of which is curved to correspond with the bottom 7 and scalloped or notched, as shown at 12, the notches 12 at one side of the shaft being arched and arranged to alternate with the corresponding notches at the opposite side of the shaft, so that the projecting portions 13 formed by the notches will practically sweep over the entire surface of the bottom during the rotation of the stirrer or agitator and keep in motion the lower strata of material contained in the receptacle 1.

I wish it to be understood that the terminal of the central projection is made straight while those on its opposite sides have their terminals constructed inclined and by means of thus constructing said terminals they serve to conform to the concavity of the bottom of the receptacle.

Above the agitator 11 is a journal bar 14 extending diametrically across the receptacle and provided with an opening or bearing for the shaft 5 and also having downturned feet 15 which are removably inserted in the socket plates 16 secured to the inner sides of the receptacle 1, as shown in both figures of the drawings. At one side the receptacle is provided with an outlet opening 17, from which extends a spout 18, and said opening is controlled by means of a sliding gate 19 held in place by cleats or flanges 20 on the spout.

By the construction above described, it will be seen that the cover 2, the shaft 5 with its agitator 11, and the journal bar 14, may all be removed from the receptacle so as to give access thereto for cleaning the same. The dished bottom 7 may be made of heavier material than the body of the receptacle and cover, so as to withstand the action of the fire. The lateral discharge in connection with the sliding gate provides for emptying the receptacle without removing the cover and other detachable parts of the popper or roaster.

A spout 21 extends downward on the inner side of the receptacle for the introduction of butter to be incorporated with the popped corn. This spout preferably consists of a piece of sheet metal bent into form and having its edges lapped and clamped between the fastened edges or seamed portions of the receptacle. I may, however, secure the spout in place in any other preferred way. The upper end of the spout 21 is preferably of funnel form and terminates adjacent an opening 22 in the cover through which the butter may be inserted without removing the cover and consequently without a corresponding reduction of temperature in the receptacle. If desired, the spout may be employed as a conductor for the introduction of corn into the closed receptacle continuously from the exterior of the receptacle, the corn inserted thereby dropping by gravity through the mass of popped corn into the dished bottom 7, while the popped corn continuously discharges through the outlet 17.

I claim:

1. A structure of the character described comprising a receptacle having mounted centrally therein a vertical shaft provided at its upper end with means for rotating the same and at its lower end with an agitator consisting of a flat plate extending on each side of said shaft diametrically of said receptacle, close to the sides thereof, and in close proximity to the bottom of said receptacle, said plate being provided on its lower edge with a series of alternating projections and notches, the projections on one side of said shaft being located at distances from said shaft intermediate the corresponding distances of the projections on the other side of said shaft whereby when said shaft is rotated said projections sweep over the entire bottom of said receptacle.

2. A structure of the character described comprising a receptacle having a concave bottom and having mounted centrally therein, a vertical shaft provided at its upper end with means for rotating the same and at its lower end with an agitator consisting of a flat plate extending on each side of said shaft diametrically of said receptacle, close to the sides thereof, and in close proximity to the bottom of said receptacle, said plate having its lower edge convex to conform to the bottom of said receptacle and being provided on its lower edge with a series of alternating projections and notches, the projections on one side of said shaft being located at distances from said shaft intermediate the corresponding distances of the projections on the other side of said shaft, whereby when said shaft is rotated said projections sweep over the entire bottom of said receptacle.

In testimony whereof, I affix my signature in presence of two witnesses.

HOMER W. RIGHTMYER.

Witnesses:
   JOHN L. FLETCHER,
   K. ALLEN.